(12) United States Patent
Bernig et al.

(10) Patent No.: US 8,424,273 B2
(45) Date of Patent: Apr. 23, 2013

(54) THERMOFORMABLE, HEAT-SEALABLE AND HEAT-SHRINKABLE MULTILAYER FILM AND METHOD OF USING THE FILM FOR PRODUCING PACKAGING TRAYS AND PACKAGES

(75) Inventors: Walter Bernig, Durach (DE); Phillip Hartmann, Ermengerst (DE); Bernard Dujardin, Brüssel (DE)

(73) Assignee: CFS Kempten GmbH, Kempten (DE)

( * ) Notice: Subject to any disclaimer, the term of this patent is extended or adjusted under 35 U.S.C. 154(b) by 508 days.

(21) Appl. No.: 12/375,258

(22) PCT Filed: Aug. 28, 2007

(86) PCT No.: PCT/EP2007/007521
§ 371 (c)(1),
(2), (4) Date: Mar. 18, 2009

(87) PCT Pub. No.: WO2008/025518
PCT Pub. Date: Mar. 6, 2008

(65) Prior Publication Data
US 2009/0301035 A1 Dec. 10, 2009

(30) Foreign Application Priority Data
Aug. 30, 2006 (DE) .......... 10 2006 040 526

(51) Int. Cl.
| | |
|---|---|
| B65B 47/10 | (2006.01) |
| B65B 53/02 | (2006.01) |
| B32B 27/08 | (2006.01) |
| B32B 27/16 | (2006.01) |
| B32B 27/32 | (2006.01) |
| B32B 7/00 | (2006.01) |
| B29C 51/42 | (2006.01) |
| B29C 51/14 | (2006.01) |
| B29C 51/10 | (2006.01) |

(52) U.S. Cl.
USPC .............. 53/442; 53/453; 264/553; 428/219; 428/220; 428/516; 428/518; 428/520; 428/522; 428/910; 428/34.9

(58) Field of Classification Search ............... 53/452, 53/453, 456; 428/219, 220, 518, 520, 522, 428/910
See application file for complete search history.

(56) References Cited

U.S. PATENT DOCUMENTS

| | | | | |
|---|---|---|---|---|
| 2,749,572 | A | * | 6/1956 | Nowak .......................... 264/522 |
| 4,457,960 | A | * | 7/1984 | Newsome ..................... 428/34.9 |
| 4,917,944 | A | * | 4/1990 | Breitscheidel et al. ..... 428/308.4 |
| 5,418,022 | A | * | 5/1995 | Anderson et al. ............. 428/35.2 |
| 5,972,447 | A | * | 10/1999 | Hata et al. ..................... 428/35.7 |

(Continued)

FOREIGN PATENT DOCUMENTS

| | | |
|---|---|---|
| DE | 2758320 A1 | 7/1978 |
| DE | 19931119 A1 | 1/2000 |

(Continued)

*Primary Examiner* — Stephen F Gerrity
(74) *Attorney, Agent, or Firm* — Norris McLaughlin & Marcus PA

(57) ABSTRACT

Sealable, thermoformable, heat-shrinkable multi-layer film having a symmetrical construction around a two-ply inner layer, and having a heat shrinkability in machine direction and in cross direction of in each case at least 20% at 93° C., the heat-shrinkability being substantially unaffected by thermoforming, and use thereof with specially equipped packaging machines.

30 Claims, 9 Drawing Sheets

U.S. PATENT DOCUMENTS

| | | | |
|---|---|---|---|
| 6,022,924 A * | 2/2000 | Akao et al. | 524/495 |
| 6,488,972 B1 * | 12/2002 | Cerani | 426/110 |
| 6,946,182 B1 * | 9/2005 | Allgeuer et al. | 428/92 |
| 7,935,301 B2 * | 5/2011 | Hofmeister et al. | 264/553 |
| 2002/0025394 A1 * | 2/2002 | Bradfute et al. | 428/34.9 |
| 2004/0043238 A1 * | 3/2004 | Wuest et al. | 428/515 |
| 2005/0031814 A1 * | 2/2005 | Dawes | 428/35.7 |
| 2005/0129969 A1 * | 6/2005 | Schell et al. | 428/516 |
| 2006/0172102 A1 * | 8/2006 | Busch et al. | 428/36.7 |
| 2006/0254218 A1 * | 11/2006 | Yamamoto et al. | 53/433 |
| 2007/0090108 A1 * | 4/2007 | Kaczmarek et al. | 220/62.22 |
| 2007/0259142 A1 * | 11/2007 | Lischefski et al. | 428/35.7 |
| 2007/0275134 A1 * | 11/2007 | Siegel et al. | 426/129 |
| 2009/0081439 A1 * | 3/2009 | Lischefski et al. | 428/220 |
| 2009/0123613 A1 * | 5/2009 | Hayes et al. | 426/106 |
| 2010/0266795 A1 * | 10/2010 | Pockat et al. | 428/35.7 |
| 2011/0052846 A1 * | 3/2011 | Hikida et al. | 428/34.9 |
| 2011/0117318 A1 * | 5/2011 | Zuercher et al. | 428/131 |

FOREIGN PATENT DOCUMENTS

| | | |
|---|---|---|
| DE | 69513952 T2 | 7/2000 |
| DE | 69722844 T2 | 5/2004 |
| DE | 102004023023 A1 | 12/2005 |
| DE | 102004042968 A1 | 3/2006 |
| DE | 102005017937 A1 | 10/2006 |
| EP | 82502 A2 * | 6/1983 |
| EP | 0571260 A2 | 11/1993 |
| WO | 9955528 A1 | 11/1999 |
| WO | 0076766 A1 | 12/2000 |
| WO | 2006092288 A1 | 9/2006 |
| WO | 2006092289 A1 | 9/2006 |
| WO | 2006092290 A2 | 9/2006 |

* cited by examiner

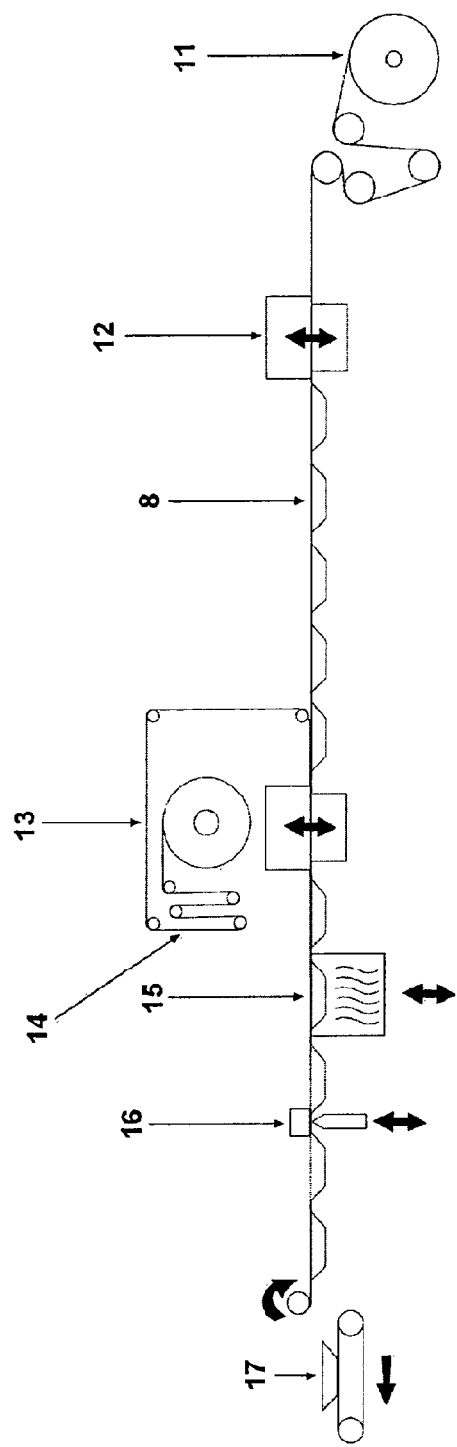
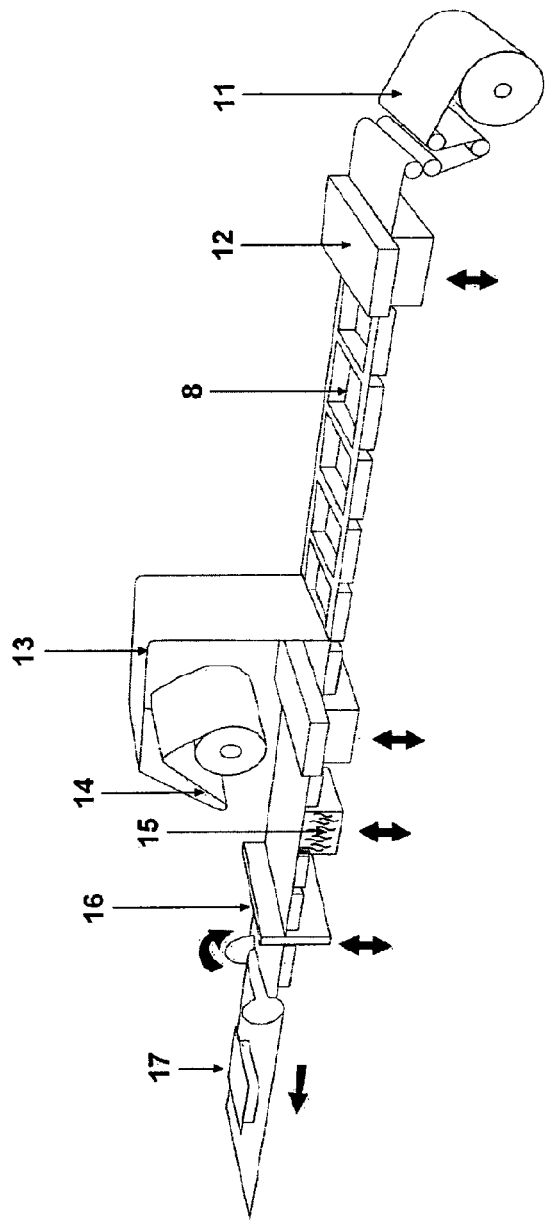
Figure 8A
Figure 8B

THERMOFORMABLE, HEAT-SEALABLE AND HEAT-SHRINKABLE MULTILAYER FILM AND METHOD OF USING THE FILM FOR PRODUCING PACKAGING TRAYS AND PACKAGES

This is a 371 Application of PCT/EP2007/007521 filed Aug. 28, 2007, which claims the benefit of Foreign Patent Application DE 10 2006 040 526.9 filed Aug. 30, 2006.

The invention relates to multilayer foils, i.e. films, which are thermoformable and at the same time are heat-shrinkable even at high total thicknesses, where the heat-shrinkability is practically unaffected by the thermoforming process, and also to packaging trays produced therefrom, and to corresponding packaging produced on an adapted packaging machine.

BACKGROUND OF THE INVENTION

Foods are nowadays increasingly frequently supplied in plastics packaging which encompasses a packaging tray into which the foods are placed and a lid foil with which the packaging tray is sealed.

The packaging trays are usually produced by thermoforming, mostly by deep-draw-thermoforming, from a thermoformable multilayer foil, with exposure to heat. After introduction of the product for packaging, the sealing of the packaging tray with the lid foil usually takes place with exposure to heat, i.e. by heat-sealing.

There is known packaging of this type in which the lid foil is composed of a heat-shrinkable multilayer foil.

Heat-shrinkable multilayer foils are usually biaxially oriented foils, being used in the packaging of foods, more particularly of perishable foods, such as poultry or fresh meat, where these multilayer foils preferably also have a barrier layer which is impermeable to gases and/or to flavors. Heat-shrinkable multilayer foils have the property of shrinking back to their original, unoriented dimensions when they are heated to temperatures above 60° C. Biaxially oriented multilayer foils are foils oriented both longitudinally and transversely, and they often have both longitudinal and transverse heat-shrinkability (shrinkage capability) greater than or equal to 35%.

There is a requirement for packaging in which the foil web from which the packaging elements, preferably the packaging trays, are produced is a heat-shrinkable multilayer foil with very good mechanical properties, so that the packaging elements produced therefrom, preferably packaging trays, also have excellent mechanical strength, more particularly puncture resistance, inter alia in order to provide safe handling of packaging produced therefrom, and where the excellent heat-shrinkability of the multilayer foil is in essence retained after the forming process and sealing process for packaging. However, this is difficult to achieve. By way of example, it is difficult to achieve the thermoformability required in a multilayer foil in order to form the packaging tray while at the same time obtaining adequate heat-shrinkability, more particularly in the thermoformed regions.

The invention is therefore based on the object of providing a multilayer foil preferably in the form of a packaging material which has advantages over the multilayer foils of the prior art. More particularly, the multilayer foil should be capable of thermoforming, preferably deep-draw-thermoforming, to give a packaging element, preferably a packaging tray, and, after introduction of the product for packaging, be capable of sealing with a further packaging element, preferably a lid foil, without any significant shrinkage of the multilayer foil before these processes are completed. The intention was that, once the sealing process has been completed, the shrink process can be induced via conventional measures, for example via exposure to heat, the result being that the multilayer foil in the form of packaging material is at least to some extent in close contact with the product for packaging. The intention here was that, after the thermoforming process and the heat-sealing process, there should still be adequate heat-shrinkability present, alongside excellent mechanical strength.

SUMMARY OF THE INVENTION

Said object can be achieved via a thermoformable, preferably deep-draw-thermoformable, sealable, heat-shrinkable multilayer foil with an identical layer structure arranged symmetrically on each of the two surfaces of a central inner layer having two sublayers, and with a longitudinal and transverse heat-shrinkability of respectively at least 20% at 93° C., in essence unaffected by a thermoforming process.

The longitudinal and transverse heat-shrinkability of the multilayer foils of the invention is respectively preferably at least 25%, more preferably at least 30%, still more preferably at least 35%, and very particularly preferably at least 40%, at 93° C.

Surprisingly, it has been found that the multilayer foils of the invention are thermoformable and heat-shrinkable, and that the exposure to heat during the course of the thermoforming process and, respectively, processing to give packaging, using suitable apparatuses, has practically no effect on the heat-shrinkability, even when the total thickness of multilayer foils processed is greater than or equal to 90 μm, preferably greater than or equal to 180 μm. The preferred use of these multilayer foils with said total thicknesses is also successful in achieving the excellent mechanical properties needed for many types of packaging, an example being that when products for packaging have irregular features, such as sharp bones, these have to be prevented from puncturing the material.

The preferred meaning of "in essence unaffected" and, respectively, "practically no effect" and, respectively, "in essence cannot be affected" for the purposes of the invention is that the thermoforming and sealing of the foil cause only slight alteration, and preferably practically no alteration, to the heat-shrinkability of the multilayer foil of the invention prior to its thermoforming and its sealing. In the event that the thermoforming process and/or sealing process causes a reduction in the heat-shrinkability, this is preferably less than 10%, more preferably less than 7.5%, and more particularly less than 5%, based on the initial heat-shrinkability of the multilayer foil.

DETAILED DESCRIPTION

One preferred embodiment of the invention provides a thermoformable, preferably deep-draw-thermoformable, sealable, heat-shrinkable multilayer foil with a central inner layer (I) having two sublayers and based on at least one thermoplastic polymer with a VICAT softening point of 65° C. or below, determined to ASTM D1525-ISO 306, which has been bonded on each of its two surfaces to an identical layer structure encompassing a suitable adhesion-promoter layer ($H_1$) adjacent to the central inner layer and preferably based on at least one polymer with a melt flow index MFI in the range from 0.1 to 2.0 g/10 min (determined to DIN ISO 1133 using 190° C. and 2.16 kg), if appropriate, a gas-barrier layer (B) based on a thermoplastic polymer, if appropriate, an adhesion-promoter layer (H$_2$), preferably based on at least one polymer with a melt flow index MFI in the range from 0.1 to 2.0 g/10 min determined to DIN ISO 1133 using 1900° C. and 2.16 kg, and a sealable surface layer (S) based on at least one thermoplastic polymer.

The sequence of the individual layers within the multilayer foil preferably corresponds to the sequence in which they are named in the above list, i.e. (S)//(H$_2$)//(B)//(H$_1$)//(I)//(H$_1$)//(B)//(H$_2$)//(S). "//" here indicates the boundary between two neighboring layers. It is not an essential requirement that two layers separated by "//" follow one another directly, i.e. are in contact with one another—it is possible that further layers have been inserted. Multilayer foils having the layer sequences (S)//(H$_1$)//(I)//(H$_1$)//(S) and (S)//(H$_2$)//(B)//(H$_1$)//(I)//(H$_1$)//(B)//(H$_2$)//(S) are particularly preferred in the invention.

It is preferable that the inner layer (I) of the multilayer foil of the invention is based on at least one thermoplastic polymer with a VICAT softening point of 650° C. or below (determined to ASTM D1525-ISO 306), an example being an acrylic acid copolymer or a thermoplastic polyurethane approved under food legislation. It is particularly preferable that the inner layer is based on at least one acrylic acid copolymer, in particular on at least one ionomer, i.e. on an ethylene-acrylic acid copolymer, or ethylene-methacrylic acid copolymer, preferably having an acid content of at least 5 mol %, where the amount of this material present in the form of salt, preferably in the form of sodium salt or of zinc salt, is preferably up to 35% (preference being given to Surlyn® from DuPont®).

In one preferred embodiment of the multilayer foil of the invention, the central inner layer (I) is composed of 2 sublayers (Ia) and (Ib), which are composed of identical thermoplastic material, and which have respectively in essence the same thickness. It is preferable that the thickness of one sublayer (Ia) and, respectively, (Ib) of the inner layer is in the range from 5 to 35 μm, particularly preferably in the range from 6 to 25 μm.

The two sublayers of the central inner layer can preferably have been bonded to one another via heating to temperatures greater than or equal to their VICAT softening point, if appropriate with application of pressure. However, it is also possible that the two sublayers have been bonded to one another with the aid of an adhesive layer. For the bonding process, it is preferable that pressures of up to at most 3 bar are applied for less than 1 second, but bonding without concomitant use of an adhesive is preferred. The adhesion between the two sublayers ((Ia) and (Ib)) of the inner layer is preferably at least 0.3 N/15 mm, particularly preferably at least 0.4 N/15 mm, measured to DIN EN ISO 527-3.

The inner layer (I) has, on each of its two surfaces, an identical layer structure, respectively bonded with the central inner layer (I) by way of an adhesion-promoter layer (H$_1$).

In principle, various polymers, copolymers, or mixtures of these can be used for the adhesion-promoter layers (H$_1$) and, if appropriate, (H$_2$). It is preferable that the adhesion-promoter layers (H$_1$) and any adhesion-promoter layers (H$_2$) present, identical or different, are based on at least one ethylene-vinyl acetate copolymer. It is particularly preferable here that the same or difference ethylene-vinyl acetate copolymers are involved, having a vinyl acetate content in the range from 3 to 18 mol %, more preferably from 5 to 17 mol %, most preferably from 10 to 16 mol %, determined to ASTM E-168. It is possible that the ethylene-vinyl acetate copolymer has been further modified, examples being acrylic acid-acrylate-modified ethylene-vinyl acetate copolymers, anhydride-modified ethylene-vinyl acetate copolymers, or a polymer blend containing at least one of the abovementioned polymers.

It is preferable that the adhesion-promoter layers (H$_1$) and, respectively, the adhesion-promoter layers (H$_2$) are respectively based on identical polymers. It is particularly preferable that all of the adhesion-promoter layers (H$_1$) and (H$_2$) are based on identical polymers.

It is preferable that the melt flow index MFI the adhesion-promoter layers (H$_1$) and of any adhesion-promoter layers (H$_2$) present, identical or different, is in the range from 0.2 to 1.9 g/10 min, more preferably from 0.3 to 1.8 g/10 min, still more preferably from 0.4 to 1.7 g/10 min, most preferably from 0.5 to 1.6 g/10 min, and more particularly from 0.6 to 1.5 g/10 min, determined to DIN ISO 1133 using 190° C. and 2.16 kg.

The adhesion-promoter layers (H$_1$) and any adhesion-promoter layers (H$_2$) present, identical or different, preferably have a layer thickness of at least 5 μm, particularly preferably from 6 to 35 μm.

In the case of the multilayer foils of the invention, it is not necessary that the adhesion-promoter layers (H$_1$) and/or any adhesion-promoter layers (H$_2$) present respectively have a greater layer thickness than the thicknesses of the respectively adjacent layers.

The two sealable layers (S) of the multilayer foil of the invention are preferably based on at least one polymer selected from the group consisting of polyolefins, olefin copolymers, polyalkyl methacrylates, alkyl methacrylate copolymers, ionomers, or on a mixture of at least two of the polymers mentioned.

In one preferred embodiment, the sealable layers (S) are based on at least one polyethylene selected from the group consisting of metallocene polyethylene (mPE), high-density polyethylene (HDPE), low-density polyethylene (LDPE), and linear low-density polyethylene (LLDPE). It is particularly preferable that the sealable layers (S) are based on mPE, LDPE, LLDPE, or a mixture of these. The sealable layers (S) are with preference based on at least one polyethylene, particularly preferably on a mixture composed of mPE, particularly preferably with a density of 0.9 g/cm$^3$ or below, and a linear low-density polyethylene (LLDPE), preferably with a density of 0.9 g/cm$^3$ or below. In one preferred embodiment, the mixture comprises from 70 to 85% by weight of LLDPE, from 30 to 15% by weight of mPE, and, if appropriate, up to 5% by weight of conventional additives, respectively based on the total weight of the sealable layer (S). The sealable layers (S) can also be based on at least one polypropylene and/or propylene copolymer, preferably on a propylene-ethylene copolymer.

The sealing temperatures are preferably in the range from 100° C. to 140° C. The melting point of the sealable layers (S) is preferably from 90 to 140° C., particularly preferably from 95° C. to 130° C. The sealable layers (S) can be equipped with the usual auxiliaries, such as antistatic agents, lubricants, antiblocking agents, antifogging agents, and/or spacers.

It is preferable that the two sealable surface layers of the multilayer foil of the invention are composed of identical polymers.

The layer thickness of the sealable layers (S) is respectively preferably at most 25% of the total layer thickness of the multilayer foil of the invention. It is preferable that each sealable layer (S) has a layer thickness in the range from 5 to 25 μm, particularly preferably from 7.5 to 20 μm.

It is preferable that the layer thicknesses of the two sealable layers are identical.

In one preferred embodiment, the multilayer foil of the invention also has, in each layer structure, a barrier layer (B), preferably an oxygen-barrier layer, and/or an adhesion-promoter layer ($H_2$), preferably in each case not only a barrier layer (B) but also an adhesion-promoter layer ($H_2$).

The barrier layer (B) is preferably based on at least one vinylidene chloride copolymer, more particularly a vinylidene chloride-methacrylic acid copolymer having up to 10% by weight methacrylic acid units. In principle, another suitable material is at least one ethylene-vinyl alcohol copolymer (EVOH).

The person skilled in the art is aware of suitable processes for measuring oxygen transmission. Oxygen transmission [$cm^3\ m^{-2}\ d^{-1}\ bar\ O_2$] is preferably at most 100, more preferably at most 50, still more preferably at most 20, and most preferably at most 10, and more particularly at most 3, determined to DIN 53380. It is preferable that the thickness of the barrier layer is respectively selected in such a way that said barrier action is achieved. A factor to be taken into account here is that the thermoforming process causes a reduction in the layer thickness of the multilayer foil of the invention.

In one preferred embodiment, the barrier layer (B) has a layer thickness in the range from 3 to 25 μm, particularly preferably from 5 to 15 μm. It is preferable that in each layer structure on each of the two surfaces of the central inner layer (I) there is a barrier layer (B), said barrier layers particularly preferably having an identical constitution and layer thickness.

In principle, one or more layers of the multilayer foil of the invention can independently also comprise conventional additives or conventional auxiliaries.

It is preferable that each of the layer structures arranged on the two sides of the central inner layer has the identical additives and/or auxiliaries in identical amounts in the same layer.

In order to vary the slip properties of the multilayer foil, each of the surface layers can comprise lubricants. However, it is also possible that lubricants are present in at least one of the layers between these. One or more layers of each layer structure of the multilayer foil can moreover comprise conventional stabilizers, antioxidants, plasticizers, processing aids, UV absorbers, fillers, flame retardants, antistatic agents, etc. The person skilled in the art is aware of substances of this type.

In one preferred embodiment of the multilayer foil of the invention, all of the layers with the exception of an adhesive layer present between (Ia) and (Ib) have a higher softening point than the inner layer (I).

The table below summarizes one particularly preferred embodiment of the multilayer foil of the invention, where the structure of the multilayer foil is (S)//($H_2$)//(B)/($H_1$)//(I)H/($H_1$)H/(B)H/($H_2$)H/(S):

| Layer | Thickness (μm) | Constitution |
|---|---|---|
| S | 14 ± 4 | Mixture composed of mPE and LLDPE |
| $H_2$ | 25 ± 4 | Mixture composed of PE and ethylene-vinyl acetate copolymer |
| B | 7 ± 3 | Vinylidene chloride copolymer |
| $H_1$ | 20 ± 5 | Mixture composed of PE and ethylene-vinyl acetate copolymer |
| Ia | 25 ± 4 | Ethylene-methacrylic acid to some extent in the form of Zn salt |
| Ib | 25 ± 4 | Ethylene/methacrylic acid to some extent in the form of Zn salt |
| $H_1$ | 20 ± 5 | Mixture composed of PE and ethylene-vinyl acetate copolymer |
| B | 7 ± 3 | Vinylidene chloride copolymer |
| $H_2$ | 25 ± 4 | Mixture composed of PE and ethylene-vinyl acetate copolymer |
| S | 14 ± 4 | Mixture composed of mPE and LLDPE |

The multilayer foil of the invention can comprise further layers in each layer structure, for example identical or different layers based on at least one polymer selected from the group consisting of polyolefins, olefin copolymers, and polyesters.

The multilayer foil of the invention can be printed, and it is preferable here that respectively at least one layer per layer structure on the two sides of the central inner layer can be printed and/or can be colored via addition of additives, such as organic or inorganic dyes and pigments.

In one preferred embodiment, the multilayer foil of the invention is transparent. The term "transparent" means for the purposes of the invention that a product for packaging is visible to the naked eye through the thermoformable multilayer foil. The transparency is preferably quantified with the aid of densitometers. The person skilled in the art is familiar with methods of this type. Haze is an optical value that can preferably be measured as a measure of the transparency. Haze is preferably measured to the ASTM D1003-61m test standard, Procedure A, after calibration of the test equipment using haze standards of from 0.3 to 34% haze. An example of a suitable tester is a Haze meter from Byk-Gardner, which uses an Ulbricht sphere, and which permits integrated measurement of diffuse light transmission values at a spherical angle of from 8° to 160°. The multilayer foils of the invention preferably have, after the thermoforming process, a haze of less than 20%, more preferably less than 18%, still more preferably less than 15%, most preferably less than 10%, and more particularly less than 8%, determined by the methods described above. It is preferable that the thermoforming process has no, or only slight, effect on the optical properties of the multilayer foils of the invention (based on material with the same thickness).

The multilayer foil of the invention is thermoformable, preferably deep-draw-thermoformable. The term "deep-draw-thermoformable" for the purposes of the invention defines a material which can be "deep-draw-thermoformed" in a suitable apparatus with exposure to heat, i.e. can be formed by exposure to pressure (and/or vacuum) by way of example to give an open container, preferably to give a tray. The material involved here is one which has thermoplastic properties and is therefore deformable when it has been heated, but at room temperature has adequate dimensional stability so that the shape (e.g. tray) prescribed by deep-draw-thermoforming is initially retained, before the subsequent shrink process is induced via introduction of heat.

The multilayer foil of the invention is heat-shrinkable, and the initial shrinkability here is practically unaffected by thermoforming and sealing. In order to achieve the heat-shrinkability, the multilayer foil is preferably biaxially oriented, preferably having a longitudinal stretching ratio (i.e. in machine direction) of from 1:5 to 1:3, preferably from 1:3.5 to 1:4.5, and a transverse stretching ratio of from 1:5 to 1:3, preferably from 1:3.5 to 1:4.5. The layer thickness data in the description are the layer thickness of the respective layer of the multilayer foil of the invention after said longitudinal and transverse orientation.

The wear properties and the strength properties of the multilayer foil of the invention, i.e. its very good mechanical properties, such as puncture resistance, can be further improved by crosslinking of one or all of the layers. Said crosslinking can by way of example be achieved by using β-radiation (high-energy electrons). The source used for irradiation can be any desired electron-beam generator operating in the range from about 150 kV to about 300 kV. The irradiation is usually undertaken using a dose of up to 150 kGy, a preferred dose being in the range from 2 to 15 Mrad.

The multilayer foil of the invention preferably has a total layer thickness of at least 60 μm, preferably at least 90 μm, particularly preferably at least 180 μm.

The multilayer foil of the invention is preferably produced by the blown-foil-coextrusion process. The person skilled in the art is aware of processes of this type. Reference can be made in this connection by way of example to A. L. Brody, K. S. Marsh, *The Wiley Encyclopedia of Packaging Technology*, Wiley-Interscience, 2nd edition (1997); W. Soroka, *Fundamentals of Packaging Technology*, Institute of Packaging Professionals (1995); J. Nentwig, *Kunststoff-Folien*, Hanser Fachbuch [Hanser Technical Volume] (2000); and S. E. M. Selke, *Understanding Plastics Packaging Technology* (Hanser Understanding Books), Hanser Gardner Publications (1997). It is also possible to use other known production processes conventional in the prior art.

In the case of the preferred blown-foil-coextrusion process, it is preferable that the resultant foil bubble is collapsed immediately after its production, the innermost layers (Ia) and (Ib) of the foil bubble being, if appropriate, bonded to one another with application of pressure of 2.5 bar, for less than 1 second, at a temperature up to or above the VICAT softening point of the polymer. As an alternative, the internal layers (Ia) and (Ib) can be bonded to one another with the aid of an adhesive, if appropriate in solution. Before the resultant multilayer foil is further processed, the edges of the collapsed foil bubble are removed, preferably by cutting, or the collapsed, bonded bubble is separated at the two sides.

The polymers used in the structure of the multilayer foil are commercially available and adequately described in the prior art. For the production of the multilayer foils of the invention, they are usually mixed in the form of pellets or granules, if necessary in conventional mixing apparatuses, and further processed by means of melting, preferably with the aid of extruders. If the multilayer foil is destined for food packaging, all of the polymers used are polymers approved for use in food packaging.

The multilayer foil of the invention has excellent suitability for the packaging of products, preferably of foods, particularly preferably of perishable foods. The multilayer foil is by way of example suitable for the packaging of foods such as meat, fish, vegetables, fruit, dairy products, smoked products, ready meals, cereals, bread products and bakery products, and also for the packaging of other products, e.g. medical products.

The invention further provides the use of the sealable, thermoformable, heat-shrinkable multilayer foil of the invention for the production of packaging or of at least one packaging element, preferably of a packaging tray, preferably for foods. When a packaging is produced, it is preferable to begin by producing a heat-shrinkable packaging tray from the multilayer foil, by thermoforming. The thermoforming process here has in essence no effect on the heat-shrinkability of the multilayer foil of the invention, including more particularly the heat-shrinkability in the thermoformed region thereof.

The invention further provides a process for the production of at least one thermoformed, sealable, heat-shrinkable packaging element, preferably of a packaging tray, encompassing the thermoforming of the thermoformable, heat-shrinkable, sealable, multilayer foil of the invention under conditions which in essence do not affect the heat-shrinkability in the thermoformed region.

The thermoforming preferably takes place via deep-draw-thermoforming. Various deep-draw-thermoforming ratios can be realized, for example from 1:2 to 1:5, preferably 1:4.5. The person skilled in the art is aware that the individual layer thickness of the multilayer foil can be adapted to the intended deep-draw-thermoforming ratio, in order that the thickness of the material remains adequate even in the deep-draw-thermoformed regions.

The invention also provides a thermoformed, heat-shrinkable packaging element, preferably a packaging tray, composed of the multilayer foil of the invention, and obtainable by the process described above.

The multilayer foil of the invention can be thermoformed and, respectively, deep-draw-thermoformed on conventional apparatuses or conventional machines. However, it is preferable that the multilayer foil of the invention is thermoformed, i.e. a sealable, thermoformed, heat-shrinkable packaging element is formed, preferably a packaging tray, by using the deep-draw-thermoforming apparatus described below to produce deep-draw-thermoformed packaging elements, preferably packaging trays. For these purposes, the property which is possessed by the multilayer foil of the invention and by virtue of which its heat-shrinkability is in essence not affected by the thermoforming process is preferably also based on a thermoforming process with the aid of said deep-draw-thermoforming apparatus described below.

By way of example, the apparatus for the production of packaging trays is described. This involves a deep-draw-thermoforming apparatus for the production of, for example, deep-draw-thermoformed packaging trays of the invention, composed of a multilayer foil of the invention in the form of foil web, with a deep-draw-thermoforming mold, where the deep-draw-thermoforming mold is cooled during the deep-draw-thermoforming process. For the cooling process during the deep-draw-thermoforming process, the deep-draw-thermoforming mold preferably has means of cooling. These means of cooling can by way of example be cooling lines which have been arranged in the region of the deep-draw-thermoforming mold, and through which a coolant, such as a liquid coolant or a gaseous coolant, circulates.

It is preferable that the apparatus has means of retention, so that the foil web can be clamped between the means of retention and the deep-draw-thermoforming mold. It is preferable that the foil web is fixed with the means of retention prior to the deep-draw-thermoforming process. In one preferred embodiment, said means of retention has likewise been provided with a means of cooling, which can have been attached to the same cooling circuit as the deep-draw-thermoforming mold or to another cooling circuit. A suitable means of cooling is more particularly a means of cooling which by way of example is also used in refrigerators and the like.

At least one cooling circuit is preferably regulated, for example temperature-regulated, so that the deep-draw-thermoforming mold and/or the means of retention always has an approximately constant temperature.

It is further preferable that the deep-draw-thermoforming apparatus has a means of heating, particularly preferably a heating plate, with which the foil web can more particularly be heated prior to the deep-draw-thermoforming process. Once the foil web has been heated, and particularly preferably prior to the deep-draw-thermoforming process, the means of heating is in turn removed from the foil web and/or switched off, in order to avoid overheating of the foil web, and in order to avoid any need to dissipate an excessive amount of heat during the cooling of the deep-draw-thermoforming mold and, respectively, of the means of retention. The heating preferably takes place locally and very specifically, so that only the desired regions are heated and more particularly not the regions intended for subsequent cooling. The person skilled in the art is aware that the heating and cooling processes can also take place simultaneously, in order to avoid concomitant heating of certain regions of the foil web during the heating of the same, and/or in order to avoid undesired heating of said regions. It is preferable that the foil web is to some extent heated and, prior to and during the deep-draw-thermoforming process, is cooled.

In another preferred embodiment, the deep-draw-thermoforming apparatus has means of applying vacuum and/or pressure to press or, respectively, draw the foil web into the deep-draw-thermoforming mold and thus give it its final shape.

The deep-draw-thermoforming apparatus is particularly suitable for the production of packaging trays of the invention from the multilayer foils of the invention, for packaging. It can preferably be a constituent of a packaging machine, preferably of what is known as a form, fill and seal packaging machine.

Using the deep-draw-thermoforming apparatus described above, the foil web of the invention is cooled during the deep-draw-thermoforming process, and a sealable, deep-draw-thermoformed, shrinkable packaging tray is thus produced from a foil web. It is preferable here that the foil web is clamped prior to the deep-draw-thermoforming process. It is further preferable that the foil web is heated prior to the deep-draw-thermoforming process. It is preferable that the heating process and the cooling process take place at a different time, the heating process preferably taking place prior to the cooling process. It is preferable that the foil web is to some extent heated prior to the deep-draw-thermoforming process, and cooled during the deep-draw-thermoforming process. The deep-draw-thermoforming process can take place in any manner familiar to the person skilled in the art. However, it is preferable that the deep-draw-thermoforming process takes place via superatmospheric pressure and/or subatmospheric pressure (vacuum).

BRIEF DESCRIPTION OF THE DRAWINGS

Preferred embodiments of the deep-draw-thermoforming apparatus are explained in more detail in connection with FIGS. 1 to 6.

FIG. 8 illustrates a packaging machine for the production of a shrink plate.

FIG. 1 shows the deep-draw-thermoforming apparatus, which has a deep-draw-thermoforming mold 3 with a plurality of deep-draw-thermoforming chambers 10.

Figure 1:
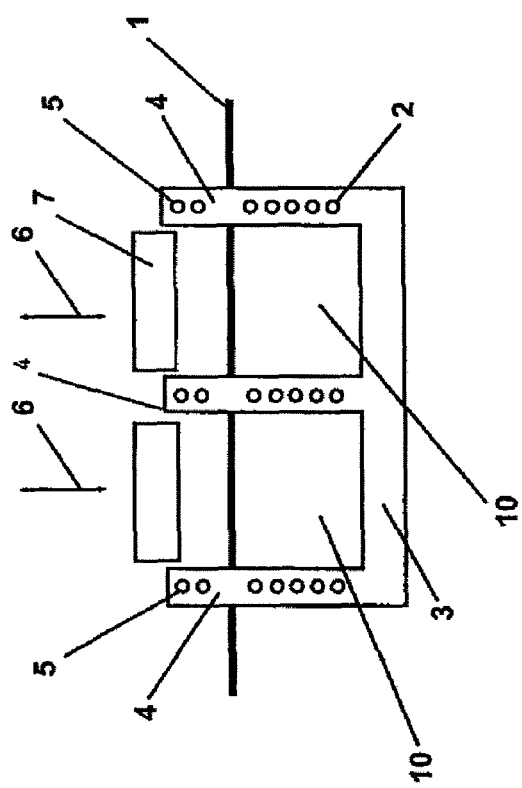
FIG. 1 shows the apparatus prior to the deep-draw-thermoforming process.

According to the invention, said deep-draw-thermoforming mold is a cooled mold, and the cooling takes place in the present case via a passage 2, through which a coolant is conducted. Above the deep-draw-thermoforming mold 3 there is the shrinkable foil web 1 of the invention, which is to be formed, and which has been clamped between the deep-draw-thermoforming mold 3 and a clamping frame 4. In the present case, the clamping frame 4 can likewise be cooled by means of the passage 5, through which a coolant is conducted. Above the foil web 1 there are heating plates 7 which, as shown by the double arrow 6, can be raised and lowered. The person skilled in the art is aware that the deep-draw-thermoforming mold 3 can likewise be moved vertically.

Figure 2:
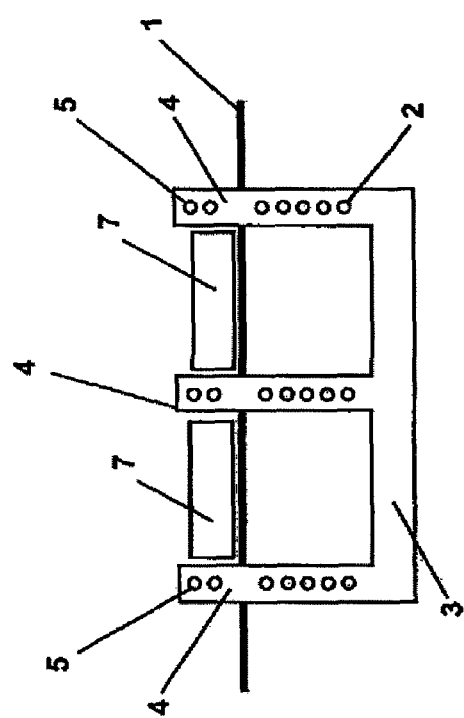
FIG. 2 shows the heating of the foil web of the invention.

FIG. 2 shows the heating of the foil web 1 of the invention, clamped between the clamping frame 4 and the deep-draw-thermoforming mold 3. For this, the heating plates 7 are lowered, so that they preferably are in contact with the foil web. The foil web is heated until it has the desired temperature in the region of the heating plate. The heating preferably takes place with time control.

Figure 3:
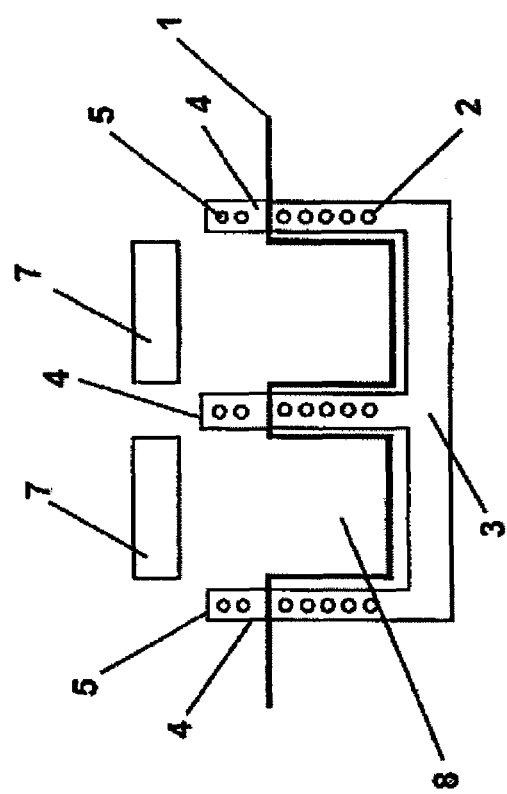
FIG. 3 shows the deep-draw-thermoforming process to give the packaging tray.

As soon as the foil web has been sufficiently heated, the heating plates are raised again, and the deep-draw-thermoforming of the shrinkable foil web 1 takes place (FIG. 3) for the production of the packaging trays 8 of the invention. In the present case, a vacuum can be applied to the deep-draw-thermoforming chambers 10, to achieve forming of the foil web as shown. The deep-draw-thermoforming mold and the clamping frame are cooled during the entire heating process and deep-draw-thermoforming process.

Figure 4:
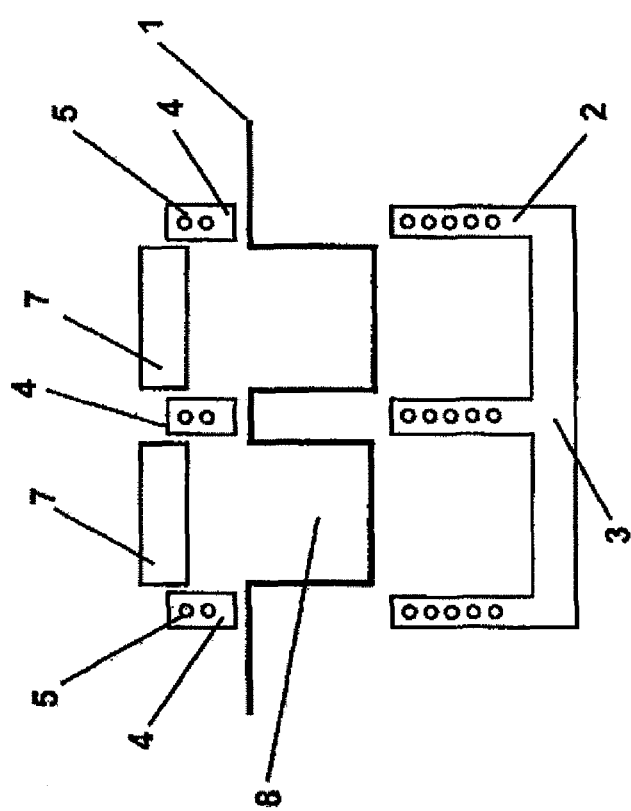
FIG. 4 shows the release of the retaining system.

As soon as the foil web 1 has been deep-draw-thermoformed (FIG. 4) to give packaging trays 8, the deep-draw-thermoforming mold 3 is lowered, so that the packaging trays 8 of the invention are demolded from the deep-draw-thermoforming mold 3. The deep-draw-thermoforming mold is lowered sufficiently far that the packaging trays produced can be transported out of the deep-draw-thermoforming region and another forming process can take place on the foil web 1.

Figure 5:
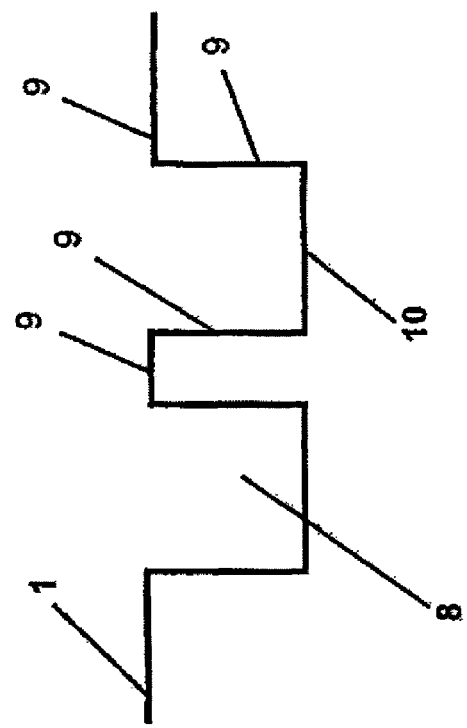
FIG. 5 shows the resultant packaging tray of the invention.

FIG. 5 shows the finished packaging trays of the invention. By virtue of the cooling of the deep-draw-thermoforming mold, the edges 9 of the pack and/or the base of the packaging is/are straight, because the foil web does not shrink at all after the deep-draw-thermoforming process, or shrinks only very slightly after or during the deep-draw-thermoforming process. The resultant deep-draw-thermoformed packaging trays are therefore heat-shrinkable, and their heat-shrinkability, like that of the multilayer foil of the invention used for this purpose, is in essence unaffected by the thermoforming process.

Figure 6:
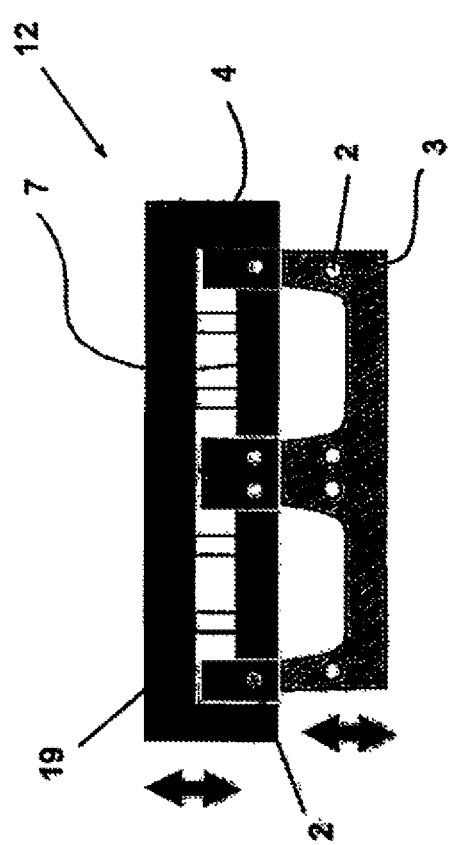
FIG. 6 shows the deep-draw-thermoforming apparatus.

FIG. 6 shows the deep-draw-thermoforming apparatus for the production of the deep-draw-thermoformed plastics packaging trays of the invention, composed of a shrinkable foil web of the invention. The apparatus 12 has a lower mold 3 and an upper mold 19. The lower mold 3 has the negative of the shape of the packaging tray to be produced. Channels 2 have been incorporated into the lower mold, and through these a coolant circulates, which cools the lower mold. As indicated by the double arrow, the lower mold can be lowered and raised. The foil web (not shown) runs between the lower mold and the upper mold. The upper mold 19 can likewise be raised and lowered. The same applies to the clamping frame 4 and the means of heating 7. The clamping frame presses and clamps the foil web against the lower mold, so that it can be deep-draw-thermoformed. The clamping frame 4 also has channels 2 through which a coolant circulates, and the frame of the clamping frame 4 can therefore be cooled. A particular advantage of the cooling of the clamping frame is that the foil web located under the clamping frame does not become heated and is therefore free from stress. This is the region to which the upper foil is subsequently sealed. By virtue of the fact that said region is free from stress, the seal of the resultant subsequent packaging is highly leakproof. The deep-draw-thermoforming apparatus of the invention has one heating element 7 for each packaging tray to be produced. Said heating elements maximize the rate of heating of the foil web. In order to improve heat transfer between the foil web and the respective means of heating, superatmospheric pressure can be generated in the region below the foil web and presses the foil web against the means of heating and thus improves heat transfer. The person skilled in the art is aware that subatmospheric pressure can also be generated between the foil web and the means of heating 7, sucking the foil web against the means of heating. As soon as the foil web has reached its plastification temperature, it is forced into the respective deep-draw-thermoforming mold by the means of heating 7, which then simultaneously act as male mold, and/or subatmospheric pressure is applied in the deep-draw-thermoforming mold, and sucks the foil web into the deep-draw-thermoforming mold. This deep-draw-thermoforming mold is a cooled mold, and the foil web is therefore cooled during and/or immediately after the deep-draw-thermoforming process. This cooling continues until the foil web has reached a temperature at which any undesired reversion of the packaging tray due to the shrinkability of the foil can be excluded.

A further aspect of the present invention therefore also provides a sealable, thermoformed, heat-shrinkable packaging element, preferably a packaging tray, encompassing a multilayer foil of the invention, or molded from a multilayer foil of the invention, where the longitudinal and transverse heat-shrinkability more particularly in the thermoformed region is respectively at least 20%, preferably at least 25%, more preferably at least 30%, still more preferably at least 35%, and most preferably at least 40%, at 93° C.

The sealable, thermoformed, heat-shrinkable packaging element of the invention, preferably a packaging tray, can advantageously be used for the production of packaging, preferably for food. To this end, it is preferable that the product to be packaged is introduced into the packaging tray, and that a heat-shrinkable or non-shrinkable lid foil is placed over the aperture of the packaging tray. The heat-sealing of the heat-shrinkable or non-heat-shrinkable lid foil to the packaging tray then takes place under conditions which in essence do not affect either the heat-shrinkability of the packaging tray or any heat-shrinkability present in the lid foil. The sealable, heat-shrinkable lid foil used can comprise a sealable, heat-shrinkable multilayer foil of the invention. The lid foil used preferably comprises a sealable, heat-shrinkable multilayer foil whose layer structure corresponds only to the layer structure (Ia) to S, therefore having only half of the number of layers of the multilayer foil of the invention, from which the thermoformed packaging tray has been produced. It is therefore preferable that the lid foil has a total thickness which is at most half of the total thickness of the multilayer foil of the invention, from which the packaging tray has been produced, but that the material is respectively composed of identical layer materials.

However, it is also possible that the lid foil used as 2nd packaging element for the sealing of the heat-shrinkable packaging tray comprises a non-shrinkable, comparatively rigid, preferably multilayer, sealable composite foil composed of thermoplastic materials.

A multilayer foil which has the following sequence of layers is particularly preferably suitable for this purpose:
A) a base layer composed of foamed or unfoamed polyolefin, preferably foamed propylene homo- and/or copolymers, or a mixture of these, or foamed or unfoamed polyester, preferably foamed polyethylene terephthalate,
B) a layer based on at least one polyolefin or polyester of the layer A)
C) if appropriate, a tie layer based on a polyolefin, which is preferably based on a monomer identical with the main monomer of the polyester of the layer A), or on a polyester of the layer A)
D) if appropriate, an adhesion-promoter layer,
E) if appropriate, a barrier layer impermeable to gases and/or to flavors,
F) an adhesion-promoter layer, and
G) a sealable and/or peelable surface layer.

A feature of the multilayer foil is preferably that the total thickness of the layers A) and B) is in the range from 0.5 to 2 mm, and the thickness of the layer B) is in the range from ⅙ to ½ of the thickness of the layer A). It is preferable that the total thickness of the layers A) and B) is in the range from 0.6 to 1.4 mm, and that the thickness of the layer B) is in the range from ⅙ to ⅓ of the thickness of the layer A).

The layer A) has preferably been foamed, and is preferably composed of at least one polyolefin, particularly preferably of foamed propylene homo- and/or copolymers, since said materials have the necessary flexural strength, even when their thickness and density is low. It is also possible to use mixtures of polyolefins for the production of the foam layer A). A particularly suitable mixture here is composed of polypropylene with long-chain branching and therefore high melt strength, and of a propylene-ethylene copolymer, e.g. a heterophasic propylene-ethylene block copolymer. A particularly suitable mixture is composed of a polypropylene with long-chain branching and a melt index MFI in the range from 1.4 to 4.2 g/10 min and of a heterophasic propylene-ethylene block copolymer in a mixing ration of 1:1.

Polyolefin foam layers which are used for the production of the packaging of the invention and which are preferably composed of polypropylene, if appropriate in a mixture with polyolefin copolymers, preferably propylene-ethylene copolymers, preferably have a density of from 0.1 to 0.8 g/cm$^3$, particularly preferably from 0.25 to 0.5 g/cm$^3$, and a cell number of from 75 to 300 cells/mm$^3$. The density and the cell number can be varied via the process parameters, e.g. the extrusion temperature or other process parameters, during the preferred production of the foam layer via extrusion and expansion. A foamed polyester layer A) can be produced in the same way.

The layer B) composed of compact polyolefin consists essentially of a polypropylene of the foamed base layer A). To the extent that said base layer is composed of foamed polypropylene or of a foamed mixture composed of polypropylene and propylene-ethylene copolymer, the compact polyolefin layer B) is preferably composed of polypropylene or of a propylene-ethylene copolymer. Particular preference is given to a heterophasic propylene-ethylene block copolymer. The melt index (MFI) of the polyolefins used for the production of the layer B) is preferably in the range from 1.8 to 5.5 g/10 min, and to the extent that the layer A) is composed of foamed polyester, said polyester is used for the production of the layer B). The thickness of the layer B) is from ⅙ to ½, particularly preferably from ⅙ to ⅓, of the thickness of the layer A).

The layer C) is present to the extent that the layers D) to G) are prefabricated via coextrusion, preferably via blown-filmcoextrusion, and require bonding to the other layers. The layer C) is based on a polyolefin, which has preferably been produced from a monomer which is also the main monomer of the polyolefins of the foam layer A), or on the polyester of the layer A). To the extent that, therefore, the layer A) is composed of a foamed polypropylene and, if appropriate, of a propylene-ethylene copolymer, the layer C) can be composed of polypropylene, if appropriate grafted with maleic anhydride. Copolymers composed of ethylene/vinyl acetate can also be used as material of the layer C). The thickness of the layer C) is preferably from 5 to 25 μm, particularly preferably from 8 to 15 μm.

To the extent that the multilayer foils of the invention are intended to have low gas transmission, i.e. low oxygen transmission and moisture transmission, and also are intended to have a flavor barrier, they have a barrier layer E). Said barrier layer is preferably composed of an ethylene/vinyl alcohol copolymer which has an ethylene content of from 32 to 45 mol %, preferably from 35 to 42 mol %. The respective surface of the barrier layer E) has been bonded with the aid of an adhesion-promoter D) and, respectively, F) to the tie layer C) and, respectively, to the surface layer G). The material used for this preferably comprises a propylene copolymer and, respectively, a polyethylene grafted with maleic anhydride.

The surface layer G) is preferably sealable and/or peelable. The production of said layer therefore preferably uses a low-density polyethylene (LDPE) with a melt index (MFI) in the range from 0.5 to 0.8 g/10 min, preferably in the range from 1 to 5 g/10 min (2.16 kg, 190° C., measured to ASTM D1238) or an ionomer polymer, e.g. a copolymer composed of an α-olefin and of an ethylenically unsaturated monomer having a carboxy group, where an amount of from 20 to 100% by weight of the carboxy groups is present in the form of metal salt, preferably in the form of zinc salt, or of an ethylene-vinyl acetate copolymer with a vinyl acetate content of from 3 to 30% by weight, preferably from 4 to 6% weight, for the production of the sealable layer.

In one particularly preferred embodiment, the sealable layer is also peelable. For this, the layer material used preferably comprises a mixture composed of LDPE and of a polybutylene (PB). For this purpose, the mixture comprises from 15 to 30% by weight of polybutylene, preferably from 20 to 28% by weight. The polybutylene preferably has a melt index (MFI) in the range from 0.3 to 2.0 g/10 min (190° C. and 216 kg, to ASTM D1238).

The thickness of the sealable layer is preferably in the range from 10 to 50 μm, preferably from 15 to 30 μm.

If LDPE is used as polymer for the production of the sealable layer, and the multilayer foil encompasses a barrier layer, an adhesion-promoter layer is very generally necessary for the bonding of the barrier layer and of the sealable layer, to the extent that no ethylene-vinyl alcohol copolymer is used as barrier-layer material. The adhesion-promoter material used can comprise a polyolefin, preferably a polyethylene grafted with maleic anhydride. However, it is also possible that the adhesion promoter used comprises a mixture composed of LDPE and LLDPE in a ratio of from 3:1 to 4:1. The thickness of the respective adhesion-promoter layer is in the range from 2 to 8 μm, preferably in the range from 3 to 6 μm.

The sealable layer G) can comprise conventional and known lubricants and antiblocking agents, e.g. erucamide, polyalkylsiloxanes, e.g. polydimethylsiloxane, and/or silicon dioxide. All or some of the layers can comprise stabilizers and further additives of known type.

The layer B) can moreover comprise from 0.5 to 2% by weight of a white pigment, e.g. kaolin, calcium carbonate, talc, titanium dioxide, or a mixture of these. When these inorganic pigments are added to the polymer from which the layer B) is manufactured, they are preferably in the form of masterbatch, which can be composed of from 30 to 50% by weight of recycled multilayer foil material.

The multilayer foils suitable as lid foils are preferably produced by the usual blown-film-coextrusion processes, or by cast-film-coextrusion processes, as far as the sequence of layers C) to G) is concerned, and preferably by an extrusion-lamination step with the, if appropriate preferably foamed, polyolefin layer or polyester layer A). For this, the layer A) and the multilayer foil, composed of the layers C) and G), are combined in such a way that the layer B) is extruded between these. Immediately after the extrusion process, a pressure is exerted on the resultant laminate and is sufficiently high to give adequate bonding between the layers A) to G).

However, it is also possible to produce these multilayer foils by coextrusion, where the layer A), too, is simultaneously coextruded with the other layers, if appropriate omitting the layer C), and in the case of the layer A) the material is, if appropriate, expanded.

The flexural strength of the non-shrinkable multilayer foils which can be used as lid foil is preferably sufficiently high that they withstand the shrink forces from the heat-shrinkable multilayer foils of the invention, from which each packaging tray of the invention is produced, in such the way that the lid of the packaging does not become bent or curved, but instead remains substantially flat, i.e. planar. The result of this is not only to ensure that the packaging has attractive appearance but also to avoid impairment of its storability and stackability, and also its presentation qualities.

Corresponding lid foils preferably have a flexural strength (measured to DIN 8075, Sigma 3.5%) of from 10 to 20 MPa, in order to withstand shrink forces of from 0.7 MPa to 2 MPa (measured to DIN 53369) from packaging trays.

The invention therefore also provides sealed, heat-shrunk packaging which has at least one packaging element composed of the multilayer foil of the invention.

It is preferable that both packaging elements are composed of a sealable, heat-shrinkable multilayer foil, the packaging tray preferably being composed of the multilayer foil of the invention. It is very particularly preferable that this type of tray is bonded with a shrinkable lid foil with a partial layer structure (Ia) to S of the multilayer foil of the invention, preferably respectively with identical layer material corresponding to the multilayer foil of the invention, to give a packaging of the invention.

For the production of this packaging of the invention, it is preferable to use packaging machines, particularly preferably those of FIG. 8 or FIG. 9, which preferably have the deep-draw-thermoforming apparatus explained above as deep-draw-thermoforming unit, and which preferably have the sealing apparatus described below, particularly preferably a sealing apparatus of FIG. 7, as sealing unit.

Using these types of packaging machines, it is possible to produce packaging from a shrinkable packaging tray of the invention (=lower foil) and from a shrinkable lid foil (=upper foil). Packaging of this type is called a shrink pack. FIG. 9 shows a packaging machine for the production of "shrink packs". However, the upper foil (lid foil) can also be composed of a non-shrinkable foil web, as described above. Packaging of this type is called a shrink plate. FIG. 8 shows a packaging machine for the production of "shrink plates".

The sealing apparatus of the packaging machine has a lower tool and an upper tool, the location of the lower tool being below, and that of the upper tool being above, the foil webs (=packaging elements) which are bonded to one another. The lower tool and the upper tool are pressed against one another for the sealing of the upper foil (=lid foil) to the lower foil (=packaging tray). The sealing of each sealable layer here to another takes place with exposure to heat. In the invention, the lower tool and/or the upper tool is/are cooled tool(s). This cooling can by way of example take place via circulation of a coolant through channels incorporated into the lower and/or the upper tool. A suitable coolant is water or the fluids known from refrigerators. The cooling of the upper foil and/or of the lower foil (=packaging tray) preferably takes place in such a way as to avoid onset of any uncontrolled shrinkage of the respective foil, i.e. the temperature of the respective foils is not permitted to reach or exceed the temperature of onset of shrinkage.

It is preferable that at least the lower tool is vertically displaceable, and particularly preferable that the upper tool, too, is vertically displaceable.

It is further preferable that the upper tool or the lower tool has a heated means of sealing, for example a sealing frame. The method of heating is generally electrical. In the procedure of the invention, the heating should advantageously be restricted to the means of sealing, in order to avoid any unnecessary cooling of the respective tool.

On the tool which does not have the sealing frame there is preferably a sealing rim arranged. The sealing rim preferably has a rubber abutment. It is further preferable that the sealing rim is cooled and particularly preferably likewise vertically displaceable.

The upper tool has preferably been arranged so as to be vertically displaceable. It is further preferable that the upper tool is cooled, so that it does not become heated over the course of time and thus bring about undesired shrinkage of any shrinkable upper foil. Said embodiment is more particularly advantageous when the upper foil is a heat-shrinkable plastics foil.

The sealing apparatus preferably has a cooling plate, particularly preferably arranged in the region of the upper foil. Said cooling plate is preferably likewise arranged so as to be vertically displaceable. For situations where the upper foil is simultaneously sealed onto a plurality of packaging trays, there is preferably a cooling plate arranged in the region of each packaging tray.

The present invention further provides a process for the production of heat-shrinkable packaging from a packaging tray of the invention and from a heat-shrinkable or non-heat-shrinkable upper foil (lid foil), where at least the packaging tray is produced from a heat-shrinkable multilayer foil of the invention by deep-draw-thermoforming, in that the foil web is to some extent heated and, prior to and during the deep-draw-thermoforming process, is to some extent cooled, and in that, during the sealing process of the upper foil onto the packaging tray, the upper foil and/or the packaging tray is/are cooled.

During the process of sealing of the packaging elements, of which at least the packaging tray has been produced from a heat-shrinkable multilayer foil of the invention, the introduction of heat for the sealing process takes place from that side of the packaging that faces away from said heat-shrinkable multilayer foil. It is preferable that the introduction of heat during the sealing process in said process of the invention takes place from below or from above.

The statements below apply to both processes of the invention, i.e. to the production of what are known as shrink packs and, respectively, shrink plates.

For the person skilled in the art, it was extremely surprising and unexpected that the process of the invention can produce packaging trays with straight edges, and/or that no undesired shrinkage takes place during or after the deep-draw-thermoforming process. The result can be packaging containers with an entirely new three-dimensional appearance and with very reproducible dimensions. The processes of the invention also prevent undesired shrinkage, initiated by the sealing tool, of a packaging element and, respectively, a heat-shrinkable lid foil produced from a heat-shrinkable multilayer foil of the invention.

As stated above, the foil web is preferably clamped prior to the deep-draw-thermoforming process. A clamping frame is preferably used for the clamping of the foil web. It is particularly preferable that this is a cooled clamping frame and most preferable that it has been arranged so as to be vertically displaceable. An advantage of a cooled clamping frame is that the subsequent sealing region is almost or entirely free from stress, the result of this being less leakage in the sealing region.

It is further preferable that the foil web of the invention is heated prior to the deep-draw-thermoforming process. It is preferable that the heating process and the cooling process take place at different times, the heating process preferably taking place prior to the cooling process. It is further preferable that one surface of the foil web is heated and that the opposite surface is cooled. In another preferred embodiment of the process of the invention, the heating process and the cooling process take place simultaneously, regions of the foil web being heated and cooled.

It is particularly preferable that the foil web is forced or sucked in the direction of the means of heating and, respectively, means of cooling, in order to maximize heat transfer. For situations in which a plurality of packaging trays are produced simultaneously, it is preferable that a means of heating is allocated to each packaging tray to be produced. The necessary heat can thus be introduced locally and very specifically into the foil web.

As stated above, the deep-draw-thermoforming process can take place in any manner familiar to the person skilled in the art. It is preferable, however, that the deep-draw-thermoforming process uses superatmospheric pressure and/or subatmospheric pressure (vacuum). It is further preferable that the deep-draw-thermoforming process uses a male mold, or that the deep-draw-thermoforming process is assisted by a male mold, and the male mold and the means of heating here can be one component.

In the invention, at least regions of the foil web are cooled prior to, during, and/or after the deep-draw-thermoforming process. More particularly, the region which is deep-draw-thermoformed is cooled during and/or after the deep-draw-thermoforming process until no further undesired reversion of the deep-draw-thermoformed region occurs. This is generally the case at temperatures below the plasticification temperature of the respective foil.

During the sealing process, the sealing tool which faces toward the packaging element produced from the heat-shrinkable multilayer foil of the invention is preferably cooled. An advantage of this embodiment of the process of the invention is that the tool facing toward the packaging element does not undesirably initiate shrinkage of the heat-shrinkable foil. When two heat-shrinkable foils are used as lid foil and in the form of the packaging tray, it is preferable that both tools are cooled.

It is preferable that at least the heat-shrinkable lower foil of the invention is fixed prior to and/or during the sealing process. The sealing tools are preferably used for the fixing process. It is further preferable that the fixing process for the heat-shrinkable foil web (=lower foil) uses the chains by which the foil web is transported along the packaging machine.

FIGS. 1 to 9 provide detailed illustration of the invention. These illustrations are merely examples, and do not restrict the general concept of the invention. The illustrations apply to the packaging tray of the invention, to the packaging of the invention, to the process of the invention, and also to the apparatuses, such as deep-draw-thermoforming apparatus, sealing unit and, respectively, packaging machine used for production of the packaging elements and, respectively, packaging of the invention.

Figure 7:
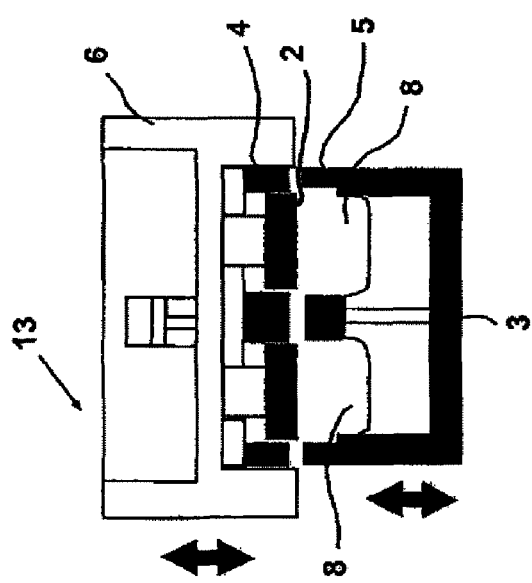
FIG. 7 illustrates a sealing apparatus.
Figure 9A:
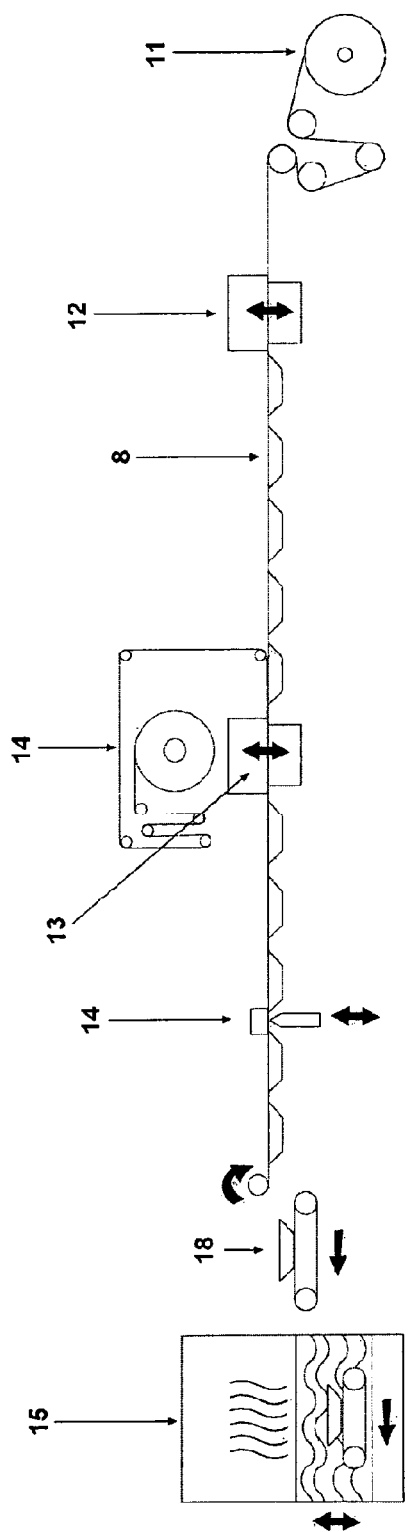
FIG. 9 illustrates two views of a packaging machine for the production of a shrink pack.
Figure 9B:
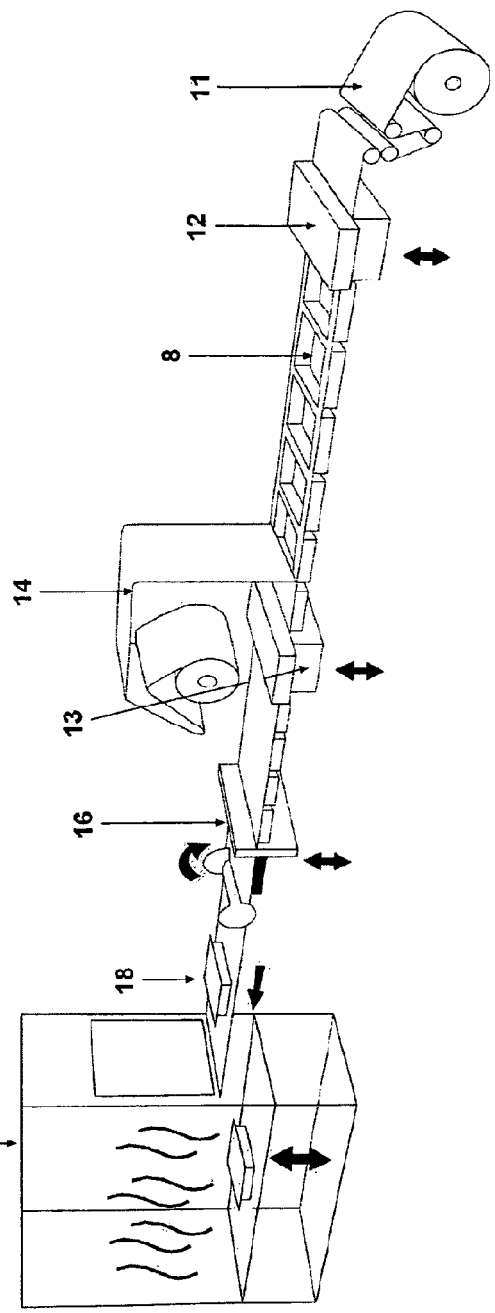

FIG. 7 shows a sealing apparatus which is preferably used for the packaging machine of FIG. 8 and, respectively, of FIG. 9.

FIG. 7 shows the sealing apparatus 13, which is composed of an upper tool 6 and of a lower tool 3'. The sealing apparatus is part of a packaging machine. In this arrangement, between the upper tool and the lower tool there is the upper foil 14 (lid foil, not shown), and also the heat-shrinkable lower foil 1 (not shown), into which packaging trays 8 have been incorporated by deep-draw-thermoforming. In the present case, the upper foil 14 (=lid foil) is likewise heat-shrinkable. The lower foil 1 is fixed and transported by two chains (not shown) in a packaging machine (not shown). The upper foil 14 is sealed to the lower foil 1 in order to close the packaging trays 8. The upper foil 14 is not fixed by chains or the like, and is transported in a known manner by virtue of its bonding to the lower foil 1. As shown by the double arrow, the upper tool is vertically displaceable. The heated sealing frame 4 has been arranged on the upper tool, and is forced against the sealing rim 5 during the sealing process. The foil webs 1 and 14 are thus pressed together. The pressure thus produced and the increased temperature bring about the sealing of the surface 14 to the edge of the packaging trays 8. Arranged on the upper tool in the region of each packaging tray there is a cooling plate 2, which prevents heating of the upper foil outside of the sealing region. This embodiment is more particularly of interest in the case of heat-shrinkable upper foils. The cooling plates 2 are likewise vertically displaceable. As indicated by the double arrow, the lower tool is also vertically displaceable. In the present case, the lower tool is also cooled, in order to prevent any undesired shrinkage of the packaging tray (=lower foil 1) during the sealing process. For situations in which the upper foil is not shrinkable, it is generally possible to omit the cooling plate 2 and any cooling of the upper tool 6.

FIG. 8 shows a packaging machine for the production of a shrink plate, i.e. packaging with a heat-shrinkable packaging tray, closed with a non-shrinkable, comparatively rigid lid foil. A foil web (=lower foil) is unwound in accordance with a cycle from a roll 11, and packaging trays 8 are molded into the foil web in the deep-draw-thermoforming apparatus 12. A product for packaging, not shown, is then placed in said packaging trays 8, which are then closed with a lid foil 14 (=upper foil) in the sealing unit 13. In the present case, the foil web 11 is composed of a heat-shrinkable foil of the invention, while the foil web 14 is non-shrinkable and relatively rigid, therefore having a supporting function. After the sealing process, the packaging trays of the packaging are shrunk in a shrink apparatus 15, where only the deep-draw-thermoformed packaging tray comes into contact with a hot fluid, such as hot air, steam, or water. The resultant finished shrunk packaging is then divided into units by the cutting apparatus 16 and transported away in the form of finished packaging 17. The respective double arrows show that one or two assemblies of the respective unit can be raised and lowered.

FIG. 9 shows two views of a packaging machine for the production of a shrink pack. A shrink pack is composed of a heat-shrinkable upper foil and of a heat-shrinkable lower foil. Again, the heat-shrinkable foil web (=lower foil) of the invention is unwound from a roll 11, and the packaging trays 8 are molded into the foil web by deep-draw-thermoforming in a molding unit 12. Once a product to be packaged, not shown, has been placed in the packaging trays, the packaging tray is closed with a foil web 14 (=upper foil) by sealing in the sealing unit 13. In the present case, the upper foil likewise involves a heat-shrinkable foil. The packaging is divided into units in a cutting unit 16 in a subsequent step of the process. The resultant packaging 18 is shrunk in a shrink tunnel by treatment on all sides with boiling water. The respective double arrows show that one or two assemblies of the respective unit can be raised and lowered.

A further aspect of the invention therefore provides the use of a packaging machine described above for the processing of a thermoformable, sealable, heat-shrinkable multilayer foil of the invention, encompassing (a) an apparatus described above for the production of deep-draw-thermoformed packaging trays from a heat-shrinkable foil web of the invention, using a deep-draw-thermoforming mold, where the deep-draw-thermoforming mold is cooled during the deep-draw-thermoforming process; and (b) a sealing apparatus described above, with a lower tool and upper tool, where the lower tool and/or upper tool is/are cooled during the sealing process.

The preferred embodiments separately described in connection with the apparatus for the production of deep-draw-thermoformed packaging trays of the invention and, respectively, with the sealing apparatus are also applicable to the use of the packaging machine for the production of the packaging of the invention.

A further aspect of the invention therefore also provides a process for the production of a packaging of the invention, which is composed at least to some extent of a thermoformable, heat-shrinkable multilayer foil of the invention, encompassing the steps of (i) in compliance with the parameters described above, production of a deep-draw-thermoformed, heat-shrinkable packaging tray as described above by deep-draw-thermoforming of a foil web composed of a sealable, thermoformable, heat-shrinkable multilayer foil of the invention, (ii) insertion of the product to be packaged, and (iii) in compliance with the parameters described above, production of sealed, heat-shrinkable packaging as described above by sealing of a heat-shrinkable lid foil or of a non-heat-shrinkable lid foil onto the deep-draw-thermoformed, heat-shrinkable packaging tray obtained in step (i).

The preferred process variants separately described in connection with the apparatus for the production of deep-draw-thermoformed packaging trays and, respectively, with the sealing apparatus and/or packaging machine are also applicable to said process of the invention for the production of a packaging of the invention.

The packaging machine described above, or the process described above, gives, or can give, sealed, heat-shrinkable packaging which encompasses, as a packaging element, the thermoformed packaging tray of the invention, and, as another packaging element, a heat-shrinkable or non-heat-shrinkable lid foil, where the two packaging elements have been sealed to one another at the edges. Since neither the thermoforming process nor the heat-sealing process induces the shrink process, the heat-shrink properties of the packaging tray and, if appropriate, of the lid foil are in essence unaffected even after the heat-sealing process, when comparison is made with the original properties. It is preferable that the longitudinal and transverse heat-shrinkability of the packaging tray, more particularly in the thermoformed region, but also any longitudinal and transverse heat-shrinkability of the lid foil, is respectively at least 20%, preferably at least 25%, more preferably at least 30%, still more preferably at least 35%, most preferably at least 40% at 93° C.

The resultant sealed, heat-shrinkable packaging of the invention is, as described above, finally shrunk, so that the thermoformed packaging tray and, if appropriate, the lid foil contract and are in close contact with the product for packaging. The shrink process is induced by introduction of heat, for example in a heated chamber.

The invention also provides heat-shrunk packaging which is obtainable by shrinking, as described above, of the sealed, heat-shrinkable packaging.

The atmosphere displaced by the shrink process can by way of example escape through a small aperture in the packaging, this aperture finally being closed. As an alternative, the packaging can be evacuated during or after the sealing process.

A further aspect of the invention provides a packaging system encompassing the multilayer foil of the invention and the packaging machine described above.

Method for Testing Heat-Shrinkability

To measure the heat-shrinkability of a multilayer foil of the invention, a foil marker is used to draw a 10×10 cm crosswire pattern on the foil sample to be tested, one line being drawn in machine direction (md), i.e. extrusion direction, and the second line of the crosswire pattern being drawn perpendicularly with respect to machine direction (cmd). The temperature of the water bath into which the foil sample is immersed for 6 sec is 93° C.

After 6 sec, the sample is removed and the reduction in the length of the crosswire pattern is measured and then stated in % for the respective direction.

Puncture resistance of a foil is measured to DIN 53373.

Example

A) The blown-film-extrusion process was first used to produce a foil bubble from a multilayer foil with the following layer structure, with orientation of 1:4 not only in machine direction but also in the direction running perpendicularly thereto:
an external sealable layer (S) based on a mixture of mPE and LLDPE in a ratio by weight of 30:70 and with a layer thickness of 14 µm,
an adhesion-promoter layer ($H_2$) based on a mixture composed of PE and of an ethylene-vinyl acetate copolymer, in a ratio by weight of 30:70 and with a layer thickness of 24 µm,
an oxygen-barrier layer (B), based on a vinylidene chloride copolymer, with a layer thickness of 7 µm,
then a further adhesion-promoter layer ($H_1$), based on a mixture identical with that for the adhesion-promoter layer described above, with a layer thickness of 20 µm, and
an internal layer (Ia), based on an ionomer, i.e. on an ethylene/methacrylic acid copolymer, present to some extent in the form of zinc salt (Surlyn® 1857), with a layer thickness of 25 µm.

The collapsed foil bubble was crosslinked with the aid of electron beams at 190 kV, using a dose of 50 kGy.

The collapsed foil bubble was bonded by heating to 65° C. and with exposure to a pressure of 2.5 bar for a time of less than 1 second. This gave a multilayer foil of the invention with a layer thickness of 180 µm.

When the shrinkability of this multilayer foil was measured by the method described above the resultant value was about 40%. The puncture resistance of the multilayer foil of the invention, measured by the method stated above, was more than 800 N.

B) The deep-draw-thermoforming apparatus described in FIG. 1 was used for processing of the multilayer foil of the invention, obtained as in A)

For this, the clamped foil web was heated to the thermoforming temperature and deep-draw-thermoformed with application of a vacuum and with cooling, using a thermoforming ratio of 1:3.3. The length of said packaging trays was 220 mm, the width was 196.5 mm and the depth was 120 mm.

To determine heat-shrinkability, a test sample was taken from a side wall of the tray. The resultant shrinkability value measured by the method described above was 38%.

KEY

| | |
|---|---|
| 1 | Foil web (= lower foil) |
| 2 | Means of cooling |
| 3 | Deep-draw-thermoforming mold, lower mold |
| 4 | Means of retention, clamping frame |
| 5 | Means of cooling |
| 6 | Base of packaging tray, double arrow |
| 7 | Means of heating, heating plates, heating element |
| 8 | Packaging tray |
| 9 | Edge of pack |
| 10 | Base of pack |
| 11 | Foil roll |
| 12 | Deep-draw-thermoforming unit |
| 13 | Sealing unit |
| 14 | Upper foil (= lid foil) |
| 15 | Shrink unit, shrink tunnel |
| 16 | Cutting unit |
| 17 | Finished, shrunk packaging |
| 18 | Packaging prior to shrinking |
| 19 | Upper tool |

The invention claimed is:

1. A thermoformable, heat-sealable and heat-shrinkable multilayer film comprising a central inner layer (I) having two sublayers (Ia and Ib), and formed of at least one thermoplastic polymer with a VICAT softening point of 65° C. or below, and the following sequence of layers on each side of the central inner layer: an adhesive promoter layer ($H_1$) formed of at least one polymer having a melt flow index (MFI) in the range of 0.1-2.0 g/10 min, optionally a gas barrier layer (B) formed of a thermoplastic polymer, optionally a further adhesive promoter layer ($H_2$), and a heat-sealable surface layer (S), said multilayer film having longitudinal and transverse heat-shrinkabilities of at least 20% at 93° C. each, which heat-shrinkabilities are each reduced by less than 10% by thermoforming.

2. The multilayer film of claim 1, wherein said gas barrier layer (B) is present.

3. The multilayer film of claim 1, wherein the central inner layer has two sides, and the layers on each side of the central inner layer have the same compositions and layer thicknesses as the corresponding layers on the other side of the central inner layer.

4. The multilayer film of claim 1, wherein the central inner layer is composed of at least one ethylene-(meth)acrylic acid copolymer, or of at least one ethylene-(meth)acrylic acid copolymer at least a portion of which is present in the form of salt, or a mixture thereof.

5. The multilayer film of claim 1, wherein the two sublayers of the central inner layer are composed of identical material and respectively have essentially the same layer thickness.

6. The multilayer film of claim 1, wherein the two sublayers of the central inner layer are bonded to one another via heating to temperatures of at least their softening point, with application of pressure.

7. The multilayer film of claim 1, wherein the adhesive promoter layers are formed of at least one ethylene-vinyl acetate copolymer.

8. The multilayer film of claim 1, wherein the gas-barrier layer is present and is formed of at least one vinylidene chloride copolymer or of at least one ethylene-vinyl alcohol copolymer.

9. The multilayer film of claim 1, wherein the two heat-sealable surface layers are respectively formed of at least one polymer selected from the group consisting of polyolefins, olefin copolymers, polyalkyl methacrylates, polyalkyl acrylates, alkyl methacrylate copolymers, alkyl acrylate copolymers, and ionomers.

10. The multilayer film of claim 9, wherein the two heat-sealable surface layers are respectively formed of at least one identical polyethylene selected from the group consisting of metallocene polyethylene (mPE), high-density polyethylene (HDPE), low-density polyethylene (LDPE), and linear low-density polyethylene (LLDPE).

11. The multilayer film of claim 1, wherein the multilayer film is biaxially oriented longitudinally and transversely using a ratio of from 1:5 to 1:3.

12. The multilayer film of claim 11, wherein the multilayer film is crosslinked via irradiation.

13. The multilayer film of claim 1, wherein the total thickness of the multilayer film is at least 60 μm.

14. The multilayer film of claim 1, wherein the multilayer film has at least 5 layers.

15. A method for producing a thermoformed, heat-shrinkable packaging tray, which comprises producing the thermoformed heat-shrinkable packaging tray from the thermoformable, heat-shrinkable multilayer film of claim 1 whereby the heat-shrinkability of said packaging tray essentially corresponds to the heat-shrinkability of the multilayer film from which the packaging tray has been produced.

16. A process for the production of a thermoformed, heat-shrinkable packaging tray by a deep-draw-thermoforming process, comprising a thermoformable, heat-shrinkable multilayer film as claimed in claim 1, wherein a web of the multilayer film is heated and, prior to and during the deep-draw-thermoforming process to give the packaging tray, is cooled.

17. The process as claimed in claim 16, wherein the web is clamped prior to the deep-draw-thermoforming process.

18. The process as claimed in claim 16, wherein the deep-draw-thermoformed web is cooled until no further reversion occurs.

19. The process of claim 16, wherein, for the production of the deep-draw-thermoformed packaging trays from the heat-shrinkable web, a deep-draw-thermoforming mold is used with a means of cooling for the cooling of the web, and the web is clamped between a means of retention and a deep-draw-thermoforming mold, where the means of retention is optionally cooled with means of cooling.

20. The process of claim 16, wherein, for the deep-draw-thermoforming process, a deep-draw-thermoforming mold is used with a heating plate, which heats the web, where the heating plate is designed as a male deep-draw-thermoforming mold.

21. The process of claim 16, wherein, for the deep-draw-thermoforming of the web, a deep-draw-thermoforming mold is used with a means of applying vacuum and/or means of applying pressure, in order to generate the contact between the web and the means of heating.

22. A process for the production of heat-shrunk packaging, encompassing:
producing a thermoformed, heat-shrinkable packaging tray by the process of claim 16,
filling the tray with contents,
sealing the resultant thermoformed, heat-shrinkable packaging tray provided with the contents, with a heat-shrinkable lid film, under conditions which essentially do not affect either the heat-shrinkability of the packaging tray or the heat-shrinkability of the lid film, and
shrinking one of the tray or lid around the contents via introduction of heat.

23. A process for the production of packaging, using the thermoformable, heat-sealable and heat-shrinkable multilayer film of claim 1, comprising the process steps of
producing a deep-draw-thermoformed, heat-shrinkable packaging tray via deep-draw-thermoforming of a sheet of the thermoformable, heat sealable, and heat-shrinkable multilayer film, where the sheet is heated and, prior to and during the deep-draw-thermoforming process, is cooled,
introducing contents to be packaged into the packaging tray,
sealing the heat-shrinkable packaging tray with a non-heat-shrinkable or heat-shrinkable lid film, where at least one of the lid film and the packaging tray is cooled, and
shrinking the tray around the contents via introduction of heat.

24. The process of claim 23, wherein the sheet is clamped prior to the deep-draw-thermoforming process, and is heated and, prior to and during the deep-draw-thermoforming process, is cooled, and the deep-draw-thermoformed sheet is cooled until no further reversion occurs.

25. The process of claim 23, wherein the heat-shrinkable lid film is present and is fixed by sealing tools or transport chains and, for the sealing of the lid to the packaging tray, the introduction of heat takes place from the side facing away from the heat-shrinkable packaging tray.

26. The process as claimed in claim 25, wherein heat is introduced from above for the sealing step and the sealing tool facing toward the heat-shrinkable packaging tray is cooled.

27. The process of claim 23, wherein the sealing step takes place with the aid of a sealing apparatus, a lower tool of which is coolable and vertically displaceable.

28. The process of claim 23, wherein the sealing step takes place with a sealing apparatus which has heatable sealing jaws, and an upper tool of the sealing apparatus has a cooling plate.

29. A process for the production of packaging encompassing:
producing a heat-shrinkable packaging tray by the process of claim 16,
filling the tray with contents,
sealing the resultant thermoformed, heat-shrinkable packaging tray, provided with the contents to be packaged, with a non-shrinkable lid film, and
shrinking the tray around the contents via introduction of heat.

30. The process of claim 29, wherein, when the tray is shrunk around the contents, the flexural strength of the lid film corresponds to the shrink forces from the heat-shrinkable packaging tray.

* * * * *